United States Patent
Flagg et al.

(10) Patent No.: US 11,006,103 B2
(45) Date of Patent: May 11, 2021

(54) INTERACTIVE IMAGING SYSTEMS AND METHODS FOR MOTION CONTROL BY USERS

(71) Applicant: Cuesta Technology Holdings, LLC, Mountain View, CA (US)

(72) Inventors: Matthew Flagg, San Diego, CA (US); Greg Roberts, San Francisco, CA (US)

(73) Assignee: Cuesta Technology Holdings, LLC, Mountain View, CA (US)

( * ) Notice: Subject to any disclaimer, the term of this patent is extended or adjusted under 35 U.S.C. 154(b) by 0 days.

(21) Appl. No.: 16/531,219

(22) Filed: Aug. 5, 2019

(65) Prior Publication Data

US 2019/0356908 A1    Nov. 21, 2019

Related U.S. Application Data

(63) Continuation of application No. 16/047,090, filed on Jul. 27, 2018, now Pat. No. 10,375,384, which is a
(Continued)

(51) Int. Cl.
*G06K 9/00* (2006.01)
*H04N 17/00* (2006.01)
(Continued)

(52) U.S. Cl.
CPC ......... *H04N 17/002* (2013.01); *G06F 3/0304* (2013.01); *G06F 3/038* (2013.01); *G06K 9/00335* (2013.01); *G06K 9/00362* (2013.01); *G06T 7/11* (2017.01); *G06T 7/194* (2017.01); *H04N 5/332* (2013.01);
(Continued)

(58) Field of Classification Search
CPC ......... G06T 7/0083; G06T 2207/20144; G06T 7/0081; G06T 2207/10016; G06T 7/11; H04N 17/002; H04N 5/332; G06F 3/0304; G06F 3/038
See application file for complete search history.

(56) References Cited

U.S. PATENT DOCUMENTS 3,778,542 A   12/1973   Hanseman
5,099,313 A    3/1992   Suemoto
(Continued)

OTHER PUBLICATIONS

Smith, Alvy Ray et al., "Blue Screen Matting," SIGGRAPH 96 Conference Proceedings, Annual Conference Series, Aug. 1996, pp. 259-268.
(Continued)

*Primary Examiner* — Amir Alavi
(74) *Attorney, Agent, or Firm* — Clements Bernard Walker; Lawrence A. Baratta, Jr.; Jacob P. Beers

(57) ABSTRACT

In various embodiments, the present invention provides a system and associated methods of calibration and use for an interactive imaging environment based on the optimization of parameters used in various segmentation algorithm techniques. These methods address the challenge of automatically calibrating an interactive imaging system, so that it is capable of aligning human body motion, or the like, to a visual display. As such the present invention provides a system and method of automatically and rapidly aligning the motion of an object to a visual display.

19 Claims, 7 Drawing Sheets

Related U.S. Application Data continuation of application No. 15/603,018, filed on May 23, 2017, now Pat. No. 10,038,896, which is a continuation of application No. 15/097,748, filed on Apr. 13, 2016, now Pat. No. 9,674,514, which is a continuation of application No. 14/490,880, filed on Sep. 19, 2014, now Pat. No. 9,342,165, which is a continuation of application No. 13/243,071, filed on Sep. 23, 2011, now Pat. No. 8,867,835, which is a continuation of application No. 11/959,348, filed on Dec. 18, 2007, now Pat. No. 8,059,894.

(60) Provisional application No. 60/875,667, filed on Dec. 19, 2006.

(51) Int. Cl.
*G06T 7/11* (2017.01)
*G06T 7/194* (2017.01)
*G06F 3/03* (2006.01)
*G06F 3/038* (2013.01)
*H04N 5/33* (2006.01)

(52) U.S. Cl.
CPC .......... *G06T 2207/10012* (2013.01); *G06T 2207/10048* (2013.01); *G06T 2207/10152* (2013.01); *G06T 2207/30196* (2013.01)

(56) References Cited

U.S. PATENT DOCUMENTS

| | | | |
|---|---|---|---|
| 6,396,873 B1 | 5/2002 | Goldstein et al. | |
| 6,791,542 B2 | 9/2004 | Matusik et al. | |
| 6,803,910 B2 | 10/2004 | Pfister et al. | |
| 7,167,201 B2 | 1/2007 | Stavely | |
| 7,436,403 B2 | 10/2008 | Debevec | |
| 7,515,822 B2 | 4/2009 | Keam | |
| 7,599,555 B2 | 10/2009 | McGuire et al. | |
| 7,602,987 B2 | 10/2009 | Kuramoto | |
| 7,609,327 B2 | 10/2009 | Matusik | |
| 7,609,888 B2 | 10/2009 | Sun et al. | |
| 7,633,511 B2 | 12/2009 | Shum et al. | |
| 7,667,774 B2 | 2/2010 | Murakami | |
| 7,680,342 B2 | 3/2010 | Steinberg et al. | |
| 7,692,664 B2 | 4/2010 | Weiss et al. | |
| 8,059,894 B1 * | 11/2011 | Flagg | G06F 3/0304 382/173 |
| 8,073,234 B2 | 12/2011 | Harris et al. | |
| 8,253,779 B2 * | 8/2012 | Stetten | A61B 8/5238 348/47 |
| 8,629,916 B2 | 1/2014 | Tanaka | |
| 8,867,835 B2 * | 10/2014 | Flagg | G06F 3/038 382/173 |
| 8,878,950 B2 * | 11/2014 | Lelescu | H04N 13/106 348/218.1 |
| 9,342,165 B2 * | 5/2016 | Flagg | G06F 3/0304 |
| 9,674,514 B2 * | 6/2017 | Flagg | G06T 7/194 |
| 10,038,896 B2 * | 7/2018 | Flagg | G06T 7/194 |
| 10,091,418 B2 * | 10/2018 | Alvarado-Moya | H04N 13/243 |
| 10,366,472 B2 * | 7/2019 | Lelescu | H04N 5/23232 |
| 10,375,384 B2 * | 8/2019 | Flagg | G06K 9/00362 |
| 2003/0223006 A1 | 12/2003 | Kito | |
| 2006/0110008 A1 * | 5/2006 | Vertegaal | G06T 7/251 382/103 |
| 2009/0202234 A1 | 8/2009 | Ichimiya | |
| 2010/0254598 A1 | 10/2010 | Yang et al. | |
| 2011/0038536 A1 | 2/2011 | Gong | |
| 2012/0013712 A1 | 1/2012 | Flagg et al. | |
| 2018/0260039 A1 | 9/2018 | Sainton | |

OTHER PUBLICATIONS

Beyer, Walter, "Traveling-Matte Photography and the Blue-Screen System: A Tutorial Paper," Journal of the Society of Motion Picture and Television Engineers (SMPTE), vol. 74, No. 3, Mar. 1965, pp. 217-239.

* cited by examiner

PROJECTOR

IR-PASS CAMERA VIEW

IR-PASS CAMERA VIEW

VISIBLE-PASS CAMERA VIEW

INTERACTIVE IMAGING SYSTEMS AND METHODS FOR MOTION CONTROL BY USERS

CROSS-REFERENCE TO RELATED APPLICATIONS

This application is a continuation of U.S. patent application Ser. No. 16/047,090, filed Jul. 27, 2018 (now U.S. Pat. No. 10,375,384 issued Aug. 6, 2019), and entitled "INTERACTIVE IMAGING SYSTEMS AND METHODS FOR MOTION CONTROL BY USERS," which is a continuation of U.S. patent application Ser. No. 15/603,018 filed May 23, 2017 (now U.S. Pat. No. 10,038,896 issued Jul. 31, 2018), and entitled "INTERACTIVE IMAGING SYSTEMS AND METHODS FOR MOTION CONTROL BY USERS," which is continuation of U.S. patent application Ser. No. 15/097,748 filed Apr. 13, 2016 (now U.S. Pat. No. 9,674,514 issued Jun. 6, 2017), and entitled "INTERACTIVE IMAGING SYSTEMS AND METHODS FOR MOTION CONTROL BY USERS," which is a continuation of U.S. patent application Ser. No. 14/490,880 filed Sep. 19, 2014 (now U.S. Pat. No. 9,342,165 issued May 17, 2016), and entitled "INTERACTIVE IMAGING SYSTEMS AND METHODS FOR MOTION CONTROL BY USERS," which is a continuation of U.S. patent application Ser. No. 13/243,071 filed Sep. 23, 2011 (now U.S. Pat. No. 8,867,835 issued Oct. 21, 2014), and entitled "SYSTEM AND ASSOCIATED METHODS OF CALIBRATION AND USE FOR AN INTERACTIVE IMAGING ENVIRONMENT," and U.S. patent application Ser. No. 11/959,348 filed Dec. 18, 2007 (now U.S. Pat. No. 8,059,894 issued Nov. 15, 2011), and entitled "SYSTEM AND ASSOCIATED METHODS OF CALIBRATION AND USE FOR AN INTERACTIVE IMAGING ENVIRONMENT," which claims the benefit of priority of U.S. Provisional Application No. 60/875,667 filed Dec. 19, 2006 and entitled "SYSTEM AND ASSOCIATED METHODS OF CALIBRATION AND USE FOR AN INTERACTIVE IMAGING ENVIRONMENT" the contents of each is incorporated in full by reference herein.

FIELD OF THE INVENTION

The present invention relates generally to the fields of interactive imaging and interactive imaging system calibration. More specifically, the present invention relates to an auto-calibrating interactive imaging system and a method by which the interactive imaging system is initialized and automatically calibrated by optimizing the parameters of a segmentation algorithm using an objective function.

BACKGROUND OF THE INVENTION

An interactive imaging experience includes an environment in which an interactive display is affected by the motion of human bodies, objects, or the like. A camera, or set of cameras, detects a number of features of the human bodies before the camera, such as their silhouettes, hands, head, and direction of motion, and determines how these features geometrically or photometrically relate to the visual display. For example, a user interacting before a front-projected display casts a shadow on an optional display medium such as a projection screen, or the like. The interactive imaging system is capable of aligning the camera's detection of the silhouette of the human body with the shadow of the human body. This geometric or photometric alignment creates a natural mapping for controlling elements in the visual display. Persons of all ages can likely recall an experience of playing with their shadows and can thus understand that their motion in front of a source of bright light will produce a shadow whose motion behaves exactly as expected. This experience is capitalized upon in an interactive imaging experience.

In order for interactive imaging systems to operate and function properly, such systems must be accurately calibrated and optimized first. Procedures exist under which the motion of the human body, or the like, is geometrically or photometrically aligned to the actual visual display, creating a natural mapping for use in an interactive imaging system. However, these interactive imaging devices and systems require an extensive period of time, often taking many hours, for calibration and initialization. Such a delay results in long periods of wait time with no use of the interactive imaging system upon setup, until such time the calibration period is completed. This is equivalent to powering on a personal computer, expecting to use it immediately, yet waiting for hours before actual use can begin. Thus, such methods of calibration in an interactive imaging system are not automatic and nearly instantaneous, as is desired.

Calibration in an interactive imaging system refers to the initialization and setting of various setup parameter values. These parameter values, once initialized, are used in various segmentation algorithms. Segmentation, generally, has to do with image processing. Segmentation is a technique concerned with splitting up an image, or visual display, into segments or regions, each segment or region holding properties distinct from the areas adjacent to it. This is often done using a binary mask, representing the presence of a foreground object in front of the visual display surface.

A conceptual example of this definition of segmentation is the image formed on an all-white front-projected visual display when a person, or the like, is placed in front of the visual display and casts a shadow upon it. In this example, only the black or shadowed region of the visual display, as viewed on a wall, projection screen, or the like, denotes the presence of a foreground element, a body or similar object, and the white color in the visual display denotes background or non-presence of a foreground object. Normally, however, this segmentation is a binary image representation that is computed using a monochrome camera input.

There are a number of segmentation techniques, or algorithms, which are already well-known in the art. Two of these segmentation techniques include background subtraction and stereo disparity-based foreground detection, both of which may be employed for generating a segmentation image.

All of these algorithms share the need to set parameters which affect the quality of the segmentation as defined by its similarity to ground truth and as defined by its speed of execution. Calibration is the process of setting these parameters in order to achieve high quality in a visual display while operating at an acceptable execution speed. Unfortunately, existing calibration methods in interactive imaging systems require too much time for actual calibration and optimization. Such time requirements produce unsuitable delays.

A common approach for generating segmentation images from a camera that faces a visual display is to filter the camera to observe only near-infrared light while ensuring that the display only emits visible, non-infrared light. By separating the sensing spectrum from the display spectrum, the problem is reduced from detecting foreground elements in a dynamic environment created by a changing display to the problem of detecting foreground elements in a static environment, similar to chroma-key compositing systems with green or blue screens.

Background subtraction is the most popular means of detecting foreground elements (segmentation) for real-time computer vision applications. A model of the background, B, is maintained over time and is usually represented as an image with no foreground elements. It is assumed that the camera can view the entire area covered by the visual display; however, it is not assumed that the boundaries of the camera align exactly with the boundaries of the visual display. Therefore, any image captured by the camera, including the background model, must be warped such that the boundaries of the visual display and warped image do align. Warping is performed by defining four coordinates in the camera image $C_1$, $C_2$, $C_3$, and $C_4$, and bilinearly interpolating the pixel values that are enclosed by a quadrilateral whose corners are defined by $C_1$, $C_2$, $C_3$, and $C_4$. As a result, the warped camera geometrically corresponds to the display. A method for automatically computing these coordinates in the camera using homographies was presented in R. Sukthankar, R. Stockton, M. Mullin. Smarter Presentations: Exploiting Homography in Camera-Projector Systems. *Proceedings of International Conference on Computer Vision*, 2001. (A homography is a 2D perspective transformation, represented by a 3×3 matrix that maps each pixel on a plane such as a camera's image plane to another plane, such as a projector's image plane, through an intermediate plane, such as the display surface.) This method, however, assumes that the display may be viewed by the camera and the camera whose image needs to be warped is infrared-pass filtered, therefore eliminating the visibility of the display. Additionally, an automatic camera-camera homography estimation method was disclosed by M. Brown and D. G. Lowe in Recognising Panoramas. In Proceedings of the 9th International Conference on Computer Vision (ICCV2003), pages 1218-1225, Nice, France, October 2003.

While these patents and other previous systems and methods have attempted to solve the above mentioned problems, none have provided an auto-calibrating interactive imaging system and a method by which the interactive imaging system is initialized and automatically calibrated by optimizing the parameters of a segmentation algorithm using an objective function. Thus, a need exists for a system and methods of calibration and use in an interactive imaging system in which the calibration of parameters for segmentation algorithms is completed at an acceptable execution speed, and in which there is no deterioration in the quality of the visual display images.

BRIEF SUMMARY OF THE INVENTION

In various embodiments, the present invention provides a system and methods of calibration and use for an interactive imaging environment based on various segmentation techniques. This system and associated methods address the challenge of automatically calibrating an interactive imaging system, so that it is capable of aligning human body motion, or the like, to a visual display. Although this disclosure details two segmentation algorithms that operate using specific hardware configurations, the disclosed calibration procedure, however, is general enough for use with other hardware configurations and segmentation algorithms.

The present invention addresses the challenge of automatically calibrating and optimizing an interactive imaging system, so that it is capable of aligning human body motion, or the like, to a visual display. As such the present invention is capable of automatically and rapidly aligning the motion of an object to a visual display.

In one exemplary embodiment of the present invention, an auto-calibrating interactive imaging system is disclosed. The auto-calibrating interactive imaging system includes a central control unit; an infrared image sensor; a visible image sensor; illumination energy devices, or the like, for illuminating the display surface with infrared light; a display of any kind, under the assumption that the display does not emit infrared light; and, optionally, a display medium.

In another exemplary embodiment of the present invention, a method of calibration and use in an interactive imaging system is provided in which the parameters for geometric calibration are automatically determined and initialized by optimizing an objective function. For example, using the background subtraction segmentation algorithm, the parameters to be optimized are $C_1$, $C_2$, $C_3$, and $C_4$, the warping parameters, which are coordinates in a camera image, corresponding to the corners of the projection.

In another exemplary embodiment of the present invention, a method of calibration and use in an interactive imaging system is provided in which the parameters for photometric calibration are automatically determined and initialized by optimizing an objective function. For example, using the background subtraction segmentation algorithm, the parameters to be optimized are a threshold, t, a median filter kernel, m, the number of median filter operations, n and the camera's exposure, e.

There has thus been outlined, rather broadly, the features of the present invention in order that the detailed description that follows may be better understood, and in order that the present contribution to the art may be better appreciated. There are additional features of the invention that will be described and which will form the subject matter of the claims. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Additional aspects and advantages of the present invention will be apparent from the following detailed description of an exemplary embodiment which is illustrated in the accompanying drawings.

BRIEF DESCRIPTION OF THE DRAWINGS

The present invention is illustrated and described herein with reference to various drawings, in which like reference numerals denote like apparatus components and/or method steps, and in which.

DETAILED DESCRIPTION OF THE INVENTION

Figure 1:
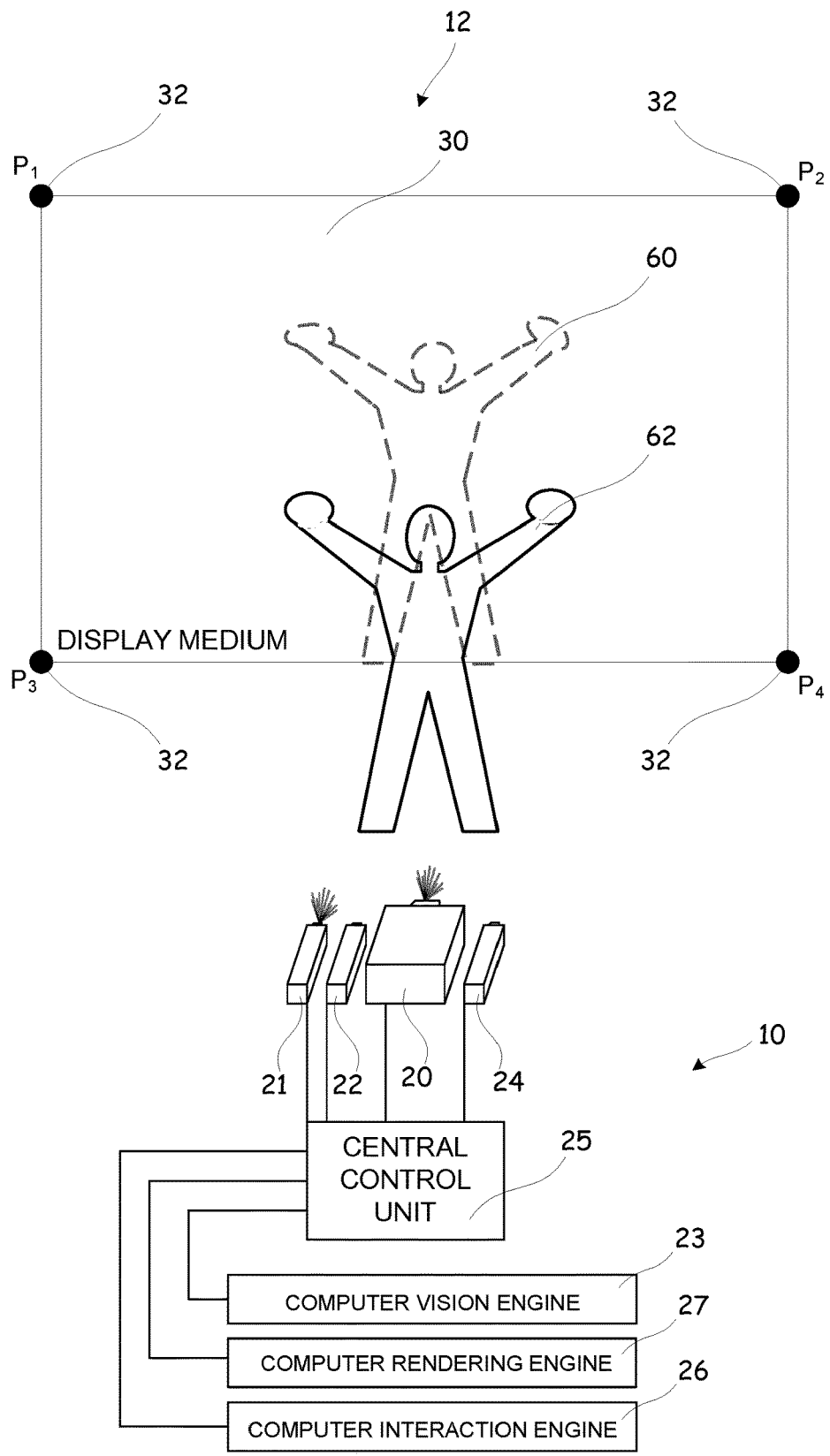
FIG. 1 is a schematic diagram illustrating the use of geometric calibration in an interactive imaging environment, particularly illustrating the projection image, according to an embodiment of the present invention.

Before describing the disclosed embodiments of the present invention in detail, it is to be understood that the invention is not limited in its application to the details of the particular arrangement shown since the invention is capable of other embodiments. Also, the terminology used herein is for the purpose of description and not of limitation.

In one exemplary embodiment of the present invention, a self-calibrating interactive imaging system 10 includes an image generator 20 operable for creating or projecting an image. The image generator 20 is, for example, a visible light projector or the like. Images that may be projected include, but are not limited to, calibration line-up silhouettes 60, waves, vapor trails, pool balls, etc. Optionally, the interactive imaging system 10 also includes a display medium 30 operable for receiving and displaying the created or projected image. The display medium 30 may include a two or three-dimensional projection screen, a wall or other flat surface, a television screen, a plasma screen, a rear-projection system, a hyper-bright organic light-emitting diode (OLED) surface (possibly sprayed-on as a flexible substrate and onto the surface of which images are digitally driven), or the like. In general, the interactive imaging system 10 is display agnostic.

The interactive imaging system 10 further includes one or more illumination energy devices 21 operable for flooding a field of view in front of the created or projected image with illumination energy. For example, the one or more illumination energy devices 21 may consist of one or more infrared lights operable for flooding the field of view in front of the created or projected image with infrared light of a wavelength of between about 700 nm and about 10,000 nm. Preferably, the infrared light consists of near-infrared light of a wavelength of between about 700 nm and about 1,100 nm. Optionally, the infrared light consists of structured (patterned) infrared light or structured (patterned) and strobed infrared light, produced via light-emitting diodes or the like. In an alternative exemplary embodiment of the present invention, the image generator 20 and the one or more illumination energy devices 21 are integrally formed and utilize a common illumination energy source.

The interactive imaging system 10 still further includes an infrared image sensor 24 operable for detecting the illumination energy which is in the infrared spectrum. The infrared image sensor 24 is, for example, an infrared-pass filtered camera, or the like. In an alternative exemplary embodiment of the present invention, the image generator 20 and the infrared image sensor 24 are integrally formed. Optionally, an optical filter is coupled with the infrared image sensor 24 and is operable for filtering out illumination energy, which is in the infrared spectrum, of a predetermined wavelength or wavelength range, such as, for example, visible light.

The interactive imaging system 10 still further includes a visible light image sensor 22 operable for detecting the illumination energy in the visible light spectrum. The visible light image sensor 22 is, for example, a visible-pass filtered camera, or the like. In an alternative exemplary embodiment of the present invention, the image generator 20 and the visible light image sensor 22 are integrally formed. In yet another alternative embodiment, the image generator 20, infrared image sensor 24, and the visible light image sensor 22 are integrally formed.

The interactive imaging system 10 still further includes a computer vision engine 23. The computer vision engine 23 is used to detect a calibration image, or line-up silhouette 60, and an actual body 62 input for purposes of calibrating the interactive imaging system 10. The computer vision engine 23 is operable for detecting one or more users, such as an actual body 62, in the field of view in front of the created or projected image and segmenting the actual body 62 and a background. The computer vision engine 23 gives the interactive imaging system 10 "sight" and provides an abstraction of the actual body 62 and the background. In this manner, the one or more actual body 62 and the background are separated and recognized. When properly implemented, the number of actual bodies 62 can be determined, even if there is overlap, and heads and hands may be tracked. Preferably, all of this takes place in real time, i.e. between about $\frac{1}{60}^{th}$ and $\frac{1}{130}^{th}$ of a second. Optionally, the computer vision engine 23 is operable for detecting an actual body 62 in the field of view in front of the created or projected image and segmenting the one or more actual body 62 and the background. The computer vision engine 23 further provides the control logic for calibrating the interactive imaging system 10 segmentation algorithms.

The interactive imaging system 10 still further includes a computer interaction engine 26 operable for inserting an abstraction related to the one or more actual body 62 and/or the background. The computer interaction engine 26 understands interactions between the one or more actual body 62 and/or the background and creates audio/visual signals in response to them. In this manner, the computer interaction engine 26 connects the computer vision engine 23 and a computer rendering engine 27 operable for modifying the created or projected image in response to the presence and/or motion of the one or more actual body 62, thereby providing user interaction with the created or projected image in a virtual environment. Again, all of this takes place in real time, i.e. between about $\frac{1}{60}^{th}$ and $\frac{1}{130}^{th}$ of a second.

The interactive imaging system 10 still further includes a central control unit 25 operable for controlling and coordinating the operation of all of the other components of the interactive imaging system 10. A central control unit 25 directly connects to the computer interaction engine 26, computer vision engine 23, computer rendering engine 27, visible light image sensor 22, infrared image sensor 24, image generator 20, and the illumination energy devices 21.

Figure 5:
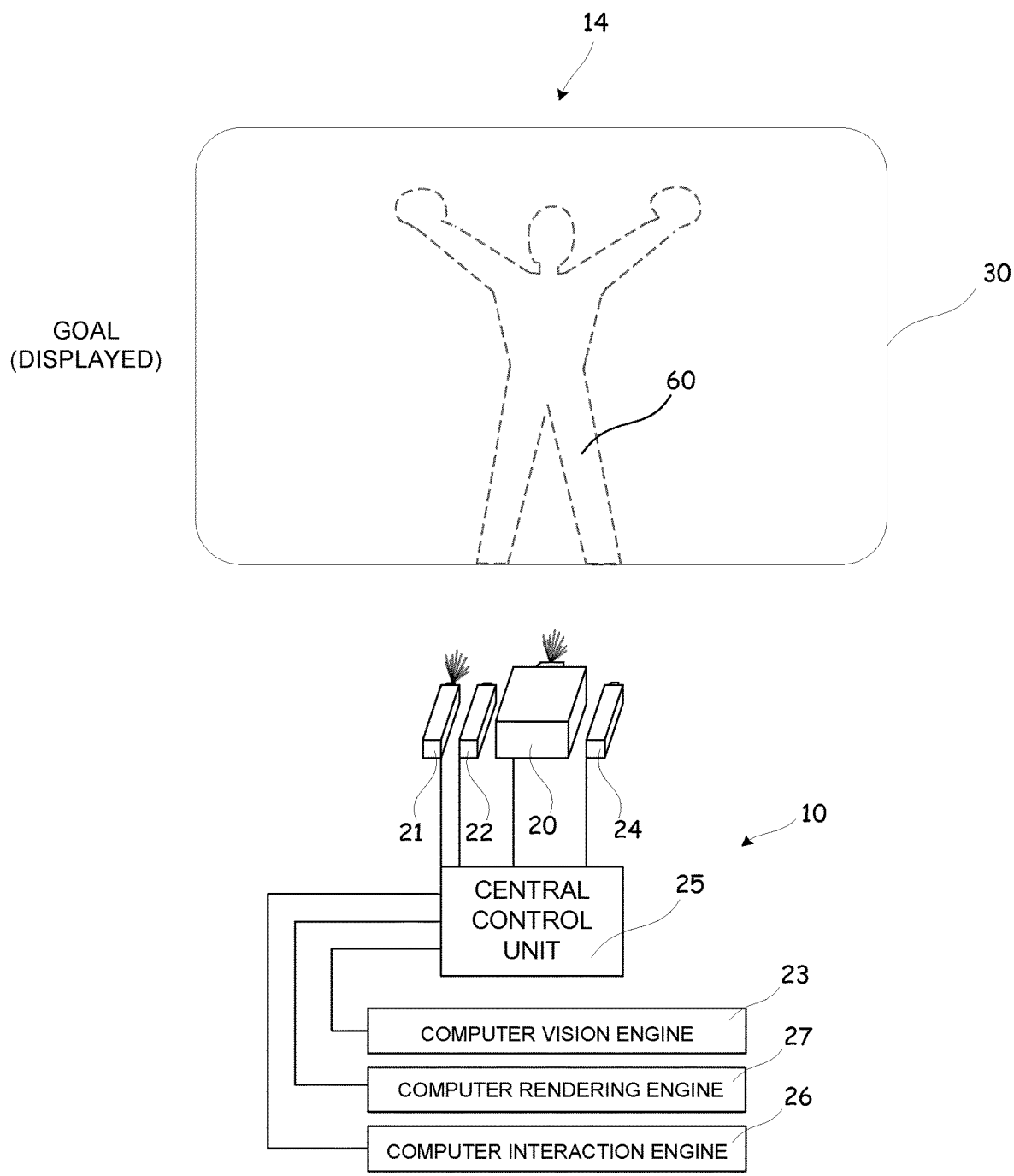
FIG. 5 is a schematic diagram illustrating the use of photometric calibration in an interactive imaging environment, particularly illustrating the visual display goal, according to an embodiment of the present invention.
Figure 6:
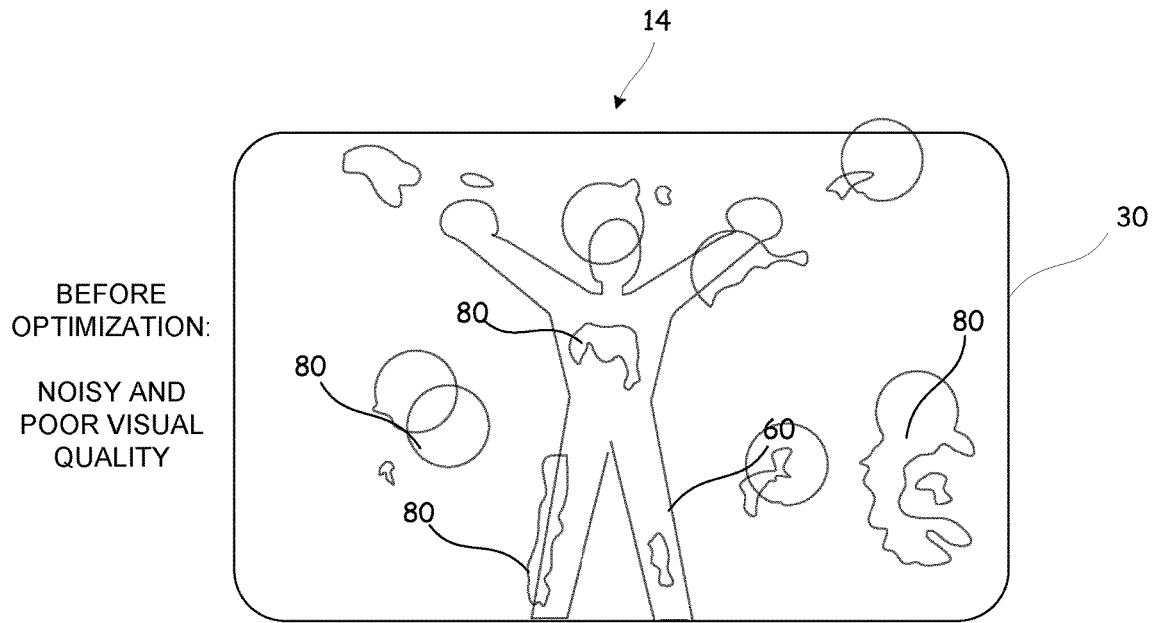
FIG. 6 is a schematic diagram illustrating the use of photometric calibration in an interactive imaging environment, particularly illustrating a non-optimized visual display with noise and having a poor visual quality, according to an embodiment of the present invention.
Figure 6:
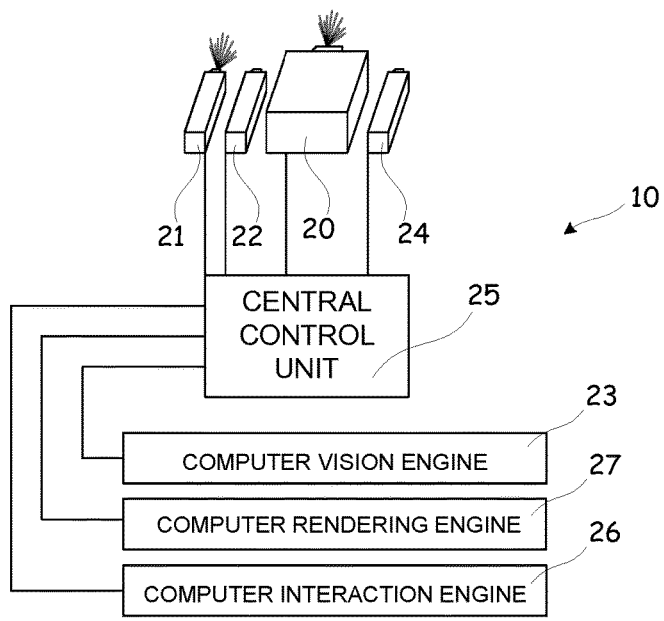
Figure 7:
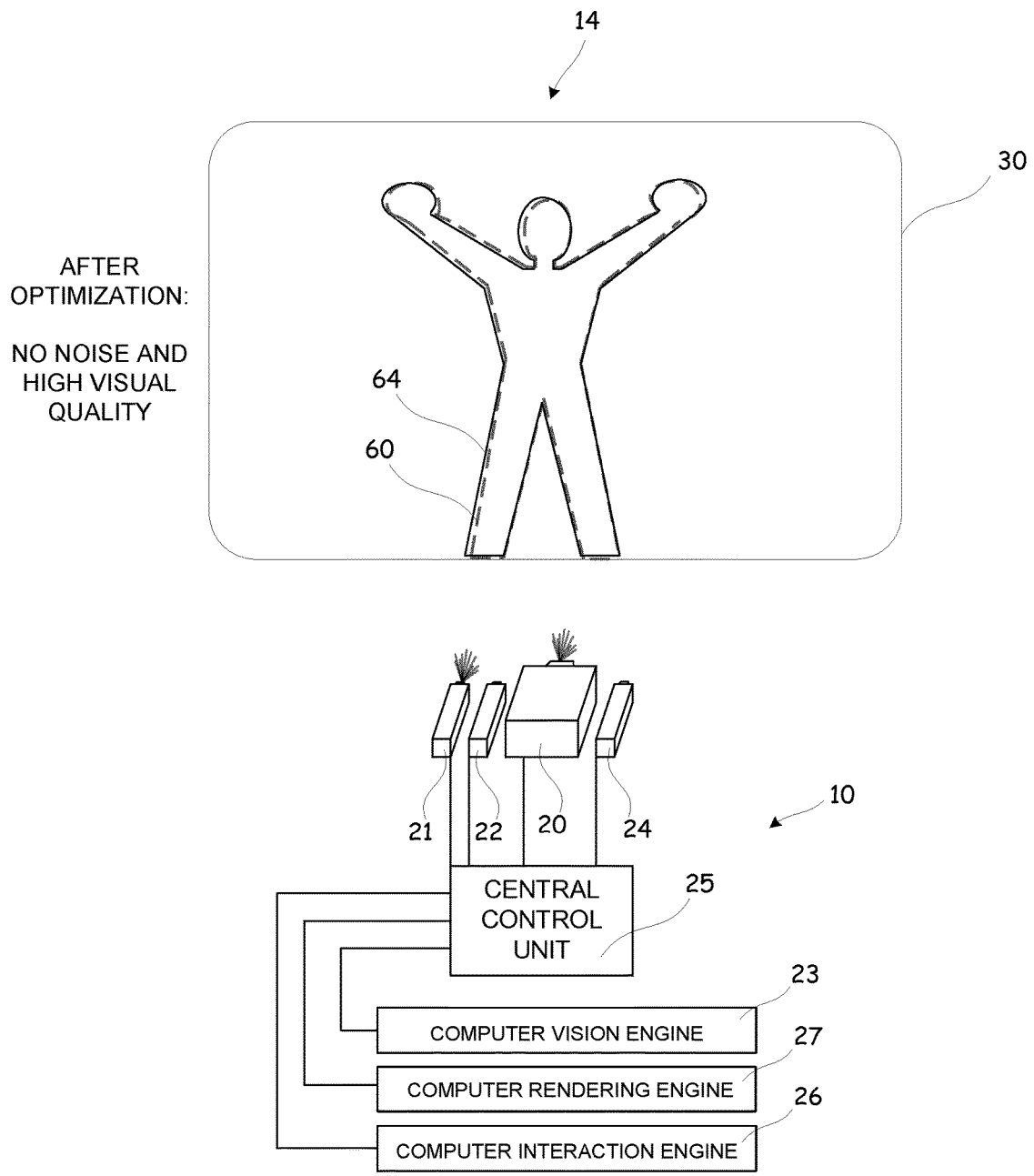
FIG. 7 is a schematic diagram illustrating the use of photometric calibration in an interactive imaging environment, particularly illustrating an optimized visual display with no noise and having a high visual quality, according to an embodiment of the present invention.

FIGS. 1 through 4 are illustrative of geometric calibration 12 examples in an interactive imaging system 10. FIGS. 5 through 7 are illustrative of photometric calibration 14 examples in an interactive imaging system 10.

Referring now to FIG. 1, a schematic diagram illustrating the use of geometric calibration 12 in an interactive imaging environment, particularly illustrating the projection image, is shown. A display medium 30, such as a projection screen, or the like, is illustrated with a line-up silhouette 60, resembling the outline of a human body, projected onto the display medium 30. As an interactive imaging system 10 user stands at a fixed location between the image generator 20 and the display medium 30, the actual body 62 presence is detected by both the visible image sensor 22 and the infrared image sensor 24. The only input on the part of the user or operator, represented as an actual body 62, is to stand in a fixed location with arms outspread, mimicking the line-up silhouette 60 projected onto the display medium 30. Each of the corners 32 of the display medium 30 are recognized by the computer vision engine 23 and central control unit 25 as $P_1$, $P_2$, $P_3$, and $P_4$.

Under certain circumstances, the display medium 30 is much larger in size than the actual body 62. For example, consider a twenty-five foot tall display medium 30. Although an actual body could stand nearer the image generator 20 and create a larger shadow, interactive imaging is better suited to the actual body that is within three to ten feet away from the display medium. In such an environment, the actual body could not cast a shadow large enough to fill the calibration image, the line-up silhouette 60. Fortunately, the central control computer 25 and the computer vision engine 23 will operate under a relative scale for calibration purposes. The actual user 62 can initiate the scaling-down process by beginning to slowly flap his or her arms up and down until the line-up silhouette has downsized (or upsized) to the appropriate scale for line up and calibration purposes.

Figure 2:
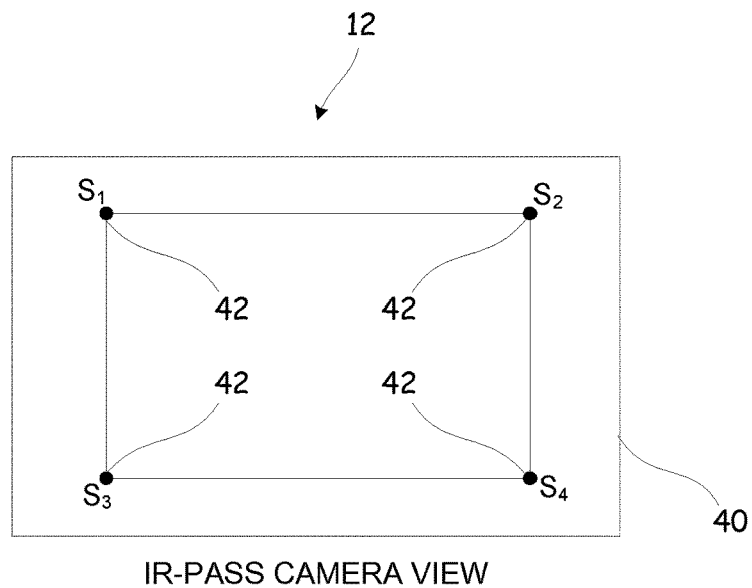
FIG. 2 is a schematic diagram illustrating the use of geometric calibration in an interactive imaging environment, particularly illustrating the visible-pass filtered camera image, according to an embodiment of the present invention.
Figure 2:
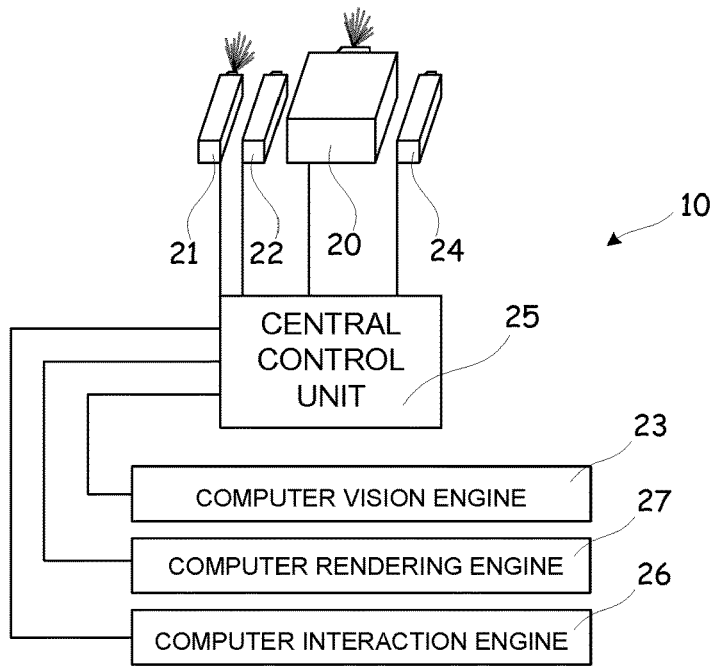

Referring now to FIG. 2, a schematic diagram illustrating the use of geometric calibration 12 in an interactive imaging system 10, particularly illustrating the view as seen by the infrared image sensor 24, is shown. The image generator 20, visible image sensor 22, infrared image sensor 24, and interactive imaging system 10 are displayed. The infrared image sensor view 40 illustrates the view as it is seen by the infrared image sensor 24. The infrared image sensor view 40 shows the outer edges of the camera's viewing range. The features 42 visible in the infrared image sensor 24, such as the four corners of a screen, in this example, are shown. The features 42 visible in the infrared image sensor 24 need not be limited to just the four corners of a screen. The features 42 may be any four references points, including, but not limited to, posted notes, black dots, and visible ink. These features 42 also alternatively include other training or testing points, under the assumption that the points are located along the same plane, yet not in a linear arrangement. The features 42 visible in the infrared image sensor 24, are recognized by the central control unit 25 as $S_1$, $S_2$, $S_3$, and $S_4$.

Figure 3:
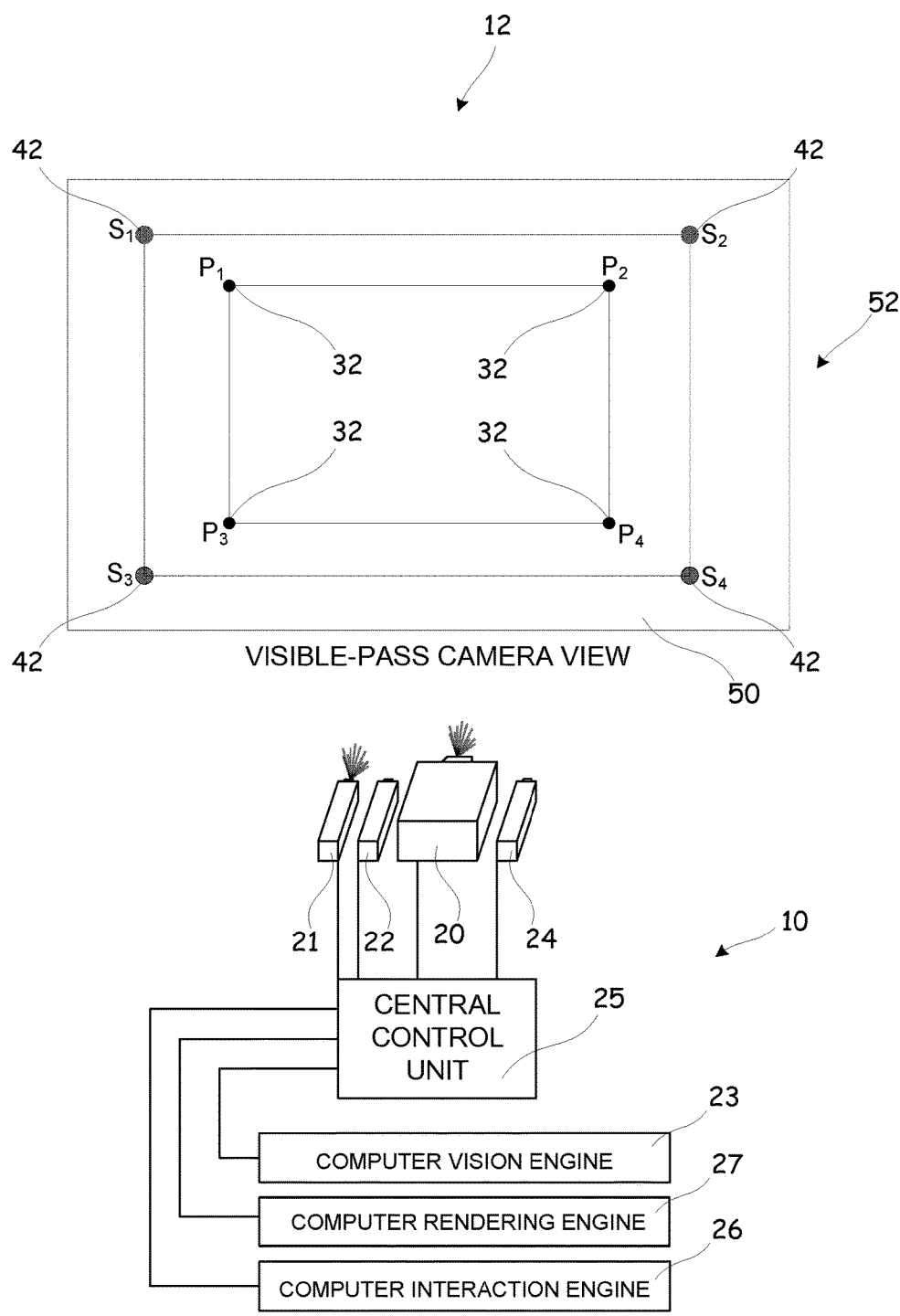
FIG. 3 is a schematic diagram illustrating the use of geometric calibration in an interactive imaging environment, particularly illustrating the infrared-pass filtered camera image, according to an embodiment of the present invention.

Referring now to FIG. 3, a schematic diagram illustrating the use of geometric calibration 12 in an interactive imaging environment, particularly illustrating the visible-light image sensor view 50, is shown. The image generator 20, visible image sensor 22, infrared image sensor 24, and interactive imaging system 10 are displayed. The visible-light image sensor view 50 illustrates the view as it is seen by the visible image sensor 22. The visible-pass filtered camera view 50 shows the outer edges of the camera's viewing range. The features 52 visible in the visible light image sensor 22, such as the four corners of the display medium 32 in this example, are shown. Each of the corners 32 of the display medium 30 are recognized by the central control unit 25 as $P_1$, $P_2$, $P_3$, and $P_4$. Additionally, features 42 visible in the infrared-pass filtered camera 24 and features 52 visible in the visible-pass filtered camera 22 allow a mapping to be made from the infrared image sensor 24 to the visible image sensor 22. This mapping is illustrated as the features 42 visible in the infrared image sensor 24, or $S_1$, $S_2$, $S_3$, and $S_4$, as recognized by the central control unit 25, are shown in the visible-pass filtered camera view 50.

Figure 4:
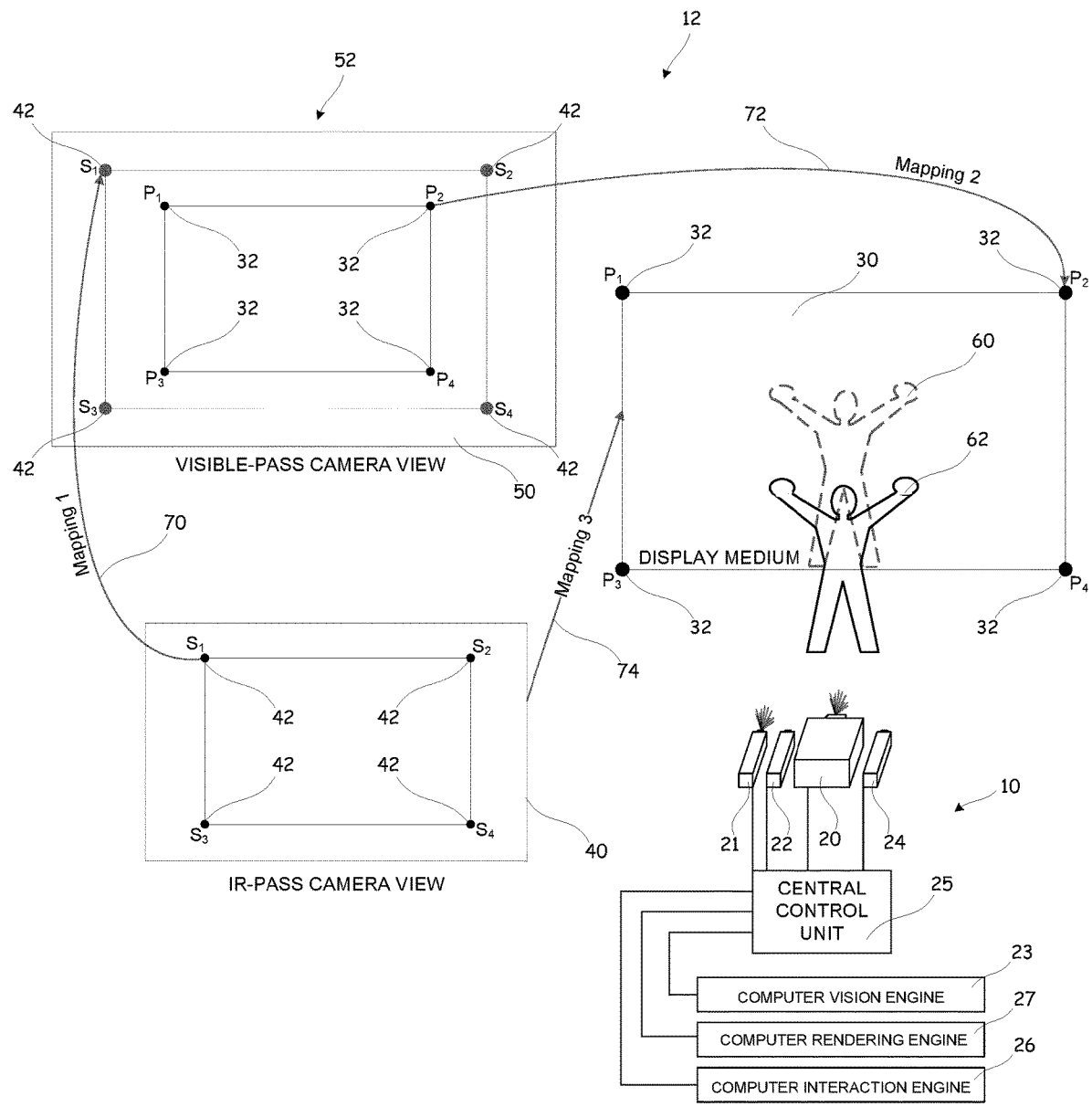
FIG. 4 is a schematic diagram illustrating the use of geometric calibration in an interactive imaging environment, particularly illustrating the various mapping techniques, according to an embodiment of the present invention.

Referring now to FIG. 4, a schematic diagram illustrating the use of geometric calibration 12 in an interactive imaging environment is shown. Each of the views previously illustrating in FIGS. 1 through 3 are shown: the view projected by the image generator 20 to an actual body 62 and onto a display medium 30, the infrared image sensor view 40, and the visible light image sensor view 50. In addition, the interactive imaging system 10 is shown. Finally, the mappings 70, 72, 74 of the various images are shown to illustrate how geometric calibration 12 is completed in an interactive imaging system 10.

Features visible in the infrared image sensor 42 and features visible in the visible image sensor 52 allow for a mapping from the infrared image sensor 24 to the visible image sensor 22. Thus, mapping 1, IR-to-VIZ, 70 illustrates an infrared-to-visible homography. The infrared image sensor 24 is unable to view the image generator 20; however, the visible image sensor 22 is able to view the image generator 20. The ability to view the image generator 20 in the visible image sensor 22 allows a mapping to be made between the visible image sensor 22 to the image generator 20. Thus, mapping 2, VIZ-to-PROJ, 72 illustrates a visible-to-projector homography. Mapping, 3 IR-to-PROJ, 74 illustrates the multiplication of the results of mapping 2, VIZ-to-PROJ, 72 multiplied against the results of the mapping 1, IR-to-VIZ, 70. Mapping 3, IR-to-PROJ, 74 is a mapping from the infrared image sensor 24 to the image generator 20. Since the infrared image sensor 24 is unable to view the image generator 20, this mapping 3, IR-to-PROJ, 74 would not be possible without the use of the visible image sensor 22, which can see the image generator 20, and the intermediate mappings, Mapping 1, IR-to-VIZ, 70 and Mapping 2, VIZ-to-PROJ, 72.

Referring now to FIG. 5, a schematic diagram illustrating the use of photometric calibration 14 in an interactive imaging environment is shown. The image generator 20, visible image sensor 22, infrared image sensor 24, and interactive imaging system 10 are displayed. Illustrated on the display medium 30 is a line-up silhouette 60 which has been projected onto the display medium 30 by the image generator 20. The line-up silhouette 60 is a calibration image. An actual body 62 (not shown) is to stand before the image generator 20 and try to fit his or her shadow into the displayed line-up silhouette 60. As the actual body 62 remains in location, the interactive image system 10 will calibrate itself, initializing the appropriate parameters to use in a given segmentation algorithm for photometric calibration 14.

Referring now to FIG. 6, a schematic diagram illustrating the use of photometric calibration 14 in an interactive imaging environment is shown. This figure illustrates the projected image before photometric calibration 14 has taken place. The image generator 20, visible image sensor 22, infrared image sensor 24, and interactive imaging system 10 are displayed. No real person or actual body 62 is shown here. Illustrated on the display medium 30 is a line-up silhouette 60 (a calibration image), which has been projected onto the display medium 30 by the image generator 20. The noise 80 located sporadically across the display medium 30 illustrates an attempt by the image generator 20, the central control unit 25, and the computer vision engine 23 to project a segmented silhouette 64 (shown in FIG. 7). However, the high levels of noise 80 and poor visual quality is resultant when optimization of the interactive imaging system 10 has not occurred. The noise 80 is what the system senses as a representation of an actual body 62. FIG. 6 illustrates an interactive imaging system 10 that is clearly not calibrated and optimized.

Referring now to FIG. 7, a schematic diagram illustrating the use of photometric calibration 14 in an interactive imaging environment is shown. This figure illustrates the projected image after photometric calibration 14 has taken place. The image generator 20, visible image sensor 22, infrared image sensor 24, and interactive imaging system 10 are displayed. Shown on the display medium 30 are both line-up silhouette 60 and the segmented silhouette 64. The line-up silhouette 60 has been projected onto the display medium 30 by the image generator 20. An actual body 62 (not shown) is to stand before the image generator 20 and try to fit his or her shadow into the displayed line-up silhouette 60. As the photometric calibration 14 takes place, the image generator 20, central control unit 25, and the computer vision engine 23 calculate and project a segmented silhouette 64 onto the display medium. Thus, after the process of photometric calibration 14, during which noise is removed and the decision variables are optimized to reach the objective, there is no noise and a high visual display quality results. The segmented silhouette 64 matches very closely to the line-up silhouette after the photometric calibration 14 process. The photometric calibration 14 process includes attaching a score to the measured differences between the many x,y coordinates of line-up silhouette 60 and the segmented silhouette 64. Any pixel coordinates that are different are counted as a point. A given configuration of the decision variables results in the score. The objective is to find the set of parameters or decision variable assignments that result in the lowest score. The lower the resultant score, the closer the segmented silhouette 64 is to the line-up silhouette 60. Once they are matching, the interactive imaging system is calibrated.

A contribution of this system and method is to use a second camera, a visible pass filtered camera, to automatically estimate camera coordinates. This system and method combines the automatic projector-camera and homography estimation method of R. Sukthankar, R. Stockton, M. Mullin. Smarter Presentations: Exploiting Homography in Camera-Projector Systems. *Proceedings of International Conference on Computer Vision,* 2001 and the automatic camera-camera homography estimation method of M. Brown and D. G. Lowe. Recognising Panoramas. In Proceedings of the 9th International Conference on Computer Vision (ICCV2003), pages 1218-1225, Nice, France, October 2003.

A homography is a 2D perspective transformation, represented by a 3×3 matrix, that maps each pixel on a plane such as a camera's image plane to another plane, such as a projector's image plane, through an intermediate plane, such as the display surface. By computing a homography between two planes, we may look up the corresponding pixel locations between the two planes. A camera-projector homography, for example, would enable the determination of the location of a projector's corner (such as the origin coordinate at x=0, y=0) to the same location in the camera (such as x=13, y=47). By estimating the projector⇆visible_camera homography and estimating the IR_camera⇆visible camera homography, one may find corresponding pixel locations between the projector and IR-pass camera. This enables the automatic determination of warping parameters $C_1$, $C_2$, $C_3$, $C_4$.

During segmentation runtime, each camera snapshot F is subtracted from the background model and the resulting difference image D=F−B is further processed to generate a binary segmentation output. A threshold variable t is used to evaluate D according to the following: If absolute_value(D) >t, output a white pixel denoting foreground, else output a black pixel denoting background. This result of this threshold operation, S, may be immediately used as a segmentation as it is a binary image with a (probably noisy) representation of the foreground. Following the threshold operation, a median filter is performed to eliminate small foreground connected components which may result from noise or error in the threshold setting. The number of median filter operations n and size of the median filter kernel m may be tuned to produce different results. Furthermore, the camera's exposure e may be changed to produce darker images if the image is overexposed and brighter images if underexposed.

The background subtraction technique for generating segmentation images requires setting the following parameters: $C_1$, $C_2$, $C_3$, $C_4$, t, m, n and e. $C_1$, $C_2$, $C_3$, $C_4$ are parameters for geometric calibration and t, m, n and e are photometric calibration parameters. The disclosed method is capable of automatically tuning these parameters by optimizing an objective function. The objective function evaluates the difference between the segmentation algorithm computed with given assigned values of the parameters or decision variables and ground truth or model of an expected segmentation for a given human configuration. The only input on the part of the user or operator is to stand in a fixed location with arms outspread, or another easily attainable, simple stationary pose.

The objective function that is optimized includes gradient descent (see Eric W. Weisstein. "Method of Steepest Descent." From *MathWorld*—A Wolfram Web Resource. http://mathworld.wolfram.com/MethodofSteepestDescent.html), Levenberg-Marquardt, (see Eric W. Weisstein. "Levenberg-Marquardt Method." From *MathWorld*—A Wolfram Web Resource. http://mathworld.wolfram.com/Levenberg-MarquardtMethod.html), and the like. Each is an optimization technique of applied mathematics and is well-known in the art.

In a preferred embodiment of the invention, the interactive imaging system 10 is set-up in an appropriate location and powered on. The image generator 20 projects a calibration image, a line-up silhouette 62, onto a display medium 30. As an interactive imaging system 10 user stands at a fixed location between the image generator 20 and the display medium 30, the actual body 62 presence is detected by both the visible image sensor 22 and the infrared image sensor 24.

Depending on which calibration method is used and depending on which segmentation algorithmic is used, various parameters will be set and initialized, and then optimized in an objective function. These parameter values, once initialized, are used in various segmentation algorithms. Calibration methods include, but are not limited to, geometric calibration 12 and photometric calibration 14.

Segmentation algorithms or techniques include, but are not limited to, background subtraction and stereo disparity-based foreground detection.

For example, if geometric calibration and background subtraction are chosen, the parameters to be optimized are $C_1$, $C_2$, $C_3$, and $C_4$, the warping parameters, which are coordinates in a camera image. In such an example, the infrared image sensor 42 and the visible image sensor 52 are both viewing the display medium 30 and actual body 62 during calibration. Features visible in the infrared image sensor 42 and features visible in the visible image sensor 52 allow for a mapping from the infrared image sensor 24 to the visible image sensor 22. Mapping 1, IR-to-VIZ, 70 illustrates an infrared-to-visible homography. The infrared image sensor 24 is unable to view the image generator 20; however, the visible image sensor 22 is able to view the image generator 20. The ability to view the image generator 20 in the visible image sensor 22 allows a mapping to be made between the visible image sensor 22 to the image generator 20. Mapping 2, VIZ-to-PROJ, 72 illustrates a visible-to-projector homography. Mapping, 3 IR-to-PROJ, 74 illustrates the multiplication of the results of mapping 2, VIZ-to-PROJ, 72 multiplied against the results of the mapping 1, IR-to-VIZ, 70. Mapping 3, IR-to-PROJ, 74 is a mapping from the infrared image sensor 24 to the image generator 20.

The coordinates in the camera image, $C_1$, $C_2$, $C_3$, $C_4$ are the parameters for geometric calibration. As the parameter values are changed, various results are produced. By estimating the VIZ-to-PROJ homography and estimating the IR-to-VIZ homography, one may find corresponding pixel locations between the image generator 20 and the infrared image sensor 24. This enables the automatic determination of warping parameters $C_1$, $C_2$, $C_3$, $C_4$.

By incorporating the use of an objective function, the differences between the segmentation algorithm, computed with given assigned values of the parameters or decision variables, and ground truth, or model of an expected segmentation for a given actual body 62 configuration, are evaluated. This in effect mathematically determines the correctness or goodness of a parameter value. With the rapid optimization of an objective function, good parameter values can be quickly set and the segmented silhouette 64, with no noise and with a high visual quality is reached, thus calibrating the interactive imaging system 10.

Although the present invention has been illustrated and described with reference to preferred embodiments and examples thereof, it will be readily apparent to those of ordinary skill in the art that other embodiments and examples may perform similar functions and/or achieve similar results. All such equivalent embodiments and examples are within the spirit and scope of the invention and are intended to be covered by the following claims.

What is claimed is:

1. A method of calibrating an interactive imaging system, the method comprising the steps of:
    performing a geometric calibration process to create warp parameters to compensate for a parallax effect by mapping a sensed infrared view to a projection image; and
    performing a photometric calibration process by matching a shadow image with the projection image,
    wherein the steps of performing the geometric calibration and performing the photometric calibration includes initializing and optimizing setup parameters used in a segmentation algorithm for execution after calibration is complete.

2. The method of claim 1, wherein mapping the sensed infrared view to the projection image includes:
    mapping, according to a first mapping process, the sensed infrared view to a sensed visible-light view;
    mapping, according to a second mapping process, the sensed visible-light view to the projection image; and
    performing a homography process by combining the first and second mapping processes.

3. The method of claim 2, wherein the homography process is a two-dimensional perspective transformation that maps pixels on a first plane defined by the sensed infrared view to pixels on a second plane defined by the projection image, the transformation made through an intermediate plane defined by the sensed visible-light view.

4. The method of claim 3, further comprising the steps of:
    obtaining the sensed infrared view by detecting at least three non-linear reference points lying in a plane; and
    obtaining the sensed visible-light view by detecting the at least three non-linear reference points and detecting corners of the projection image.

5. The method of claim 1, wherein the segmentation algorithm includes a segmentation process of splitting up the projection image into segments, wherein each segment holds properties distinct from areas adjacent to the respective segment.

6. The method of claim 1, wherein the segmentation algorithm includes tracking, in real time, at least a head and/or pair of hands of a user creating the shadow image.

7. The method of claim 6, wherein the tracking in real time includes performing the tracking within $\frac{1}{60}$ of a second.

8. The method of claim 1, wherein the segmentation algorithm includes background subtraction and stereo disparity based foreground detection.

9. The method of claim 8, wherein the background subtraction includes the steps of:
    setting the warp parameters; and
    tuning a threshold variable t, a number n of median filter operations, a size m of median filter kernels, and an exposure e of a camera configured to sense a visible-light image of a user casting the shadow image;
    wherein tuning the variables t, n, m, and e optimizes an objective function.

10. The method of claim 9, wherein optimizing the objective function includes evaluating a difference between the segmentation algorithm computed with given parameters and the segmentation algorithm based on an expected segmentation.

11. The method of claim 1, wherein the step of performing the photometric calibration includes the steps of:
    allowing a user to stand between an image generator and a display medium, wherein the image generator is configured to project the projection image and the display medium configured to reflect the projection image; and
    allowing the user to move into a position such that the shadow image cast by the user mimics a line-up silhouette of the projection image.

12. The method of claim 11, wherein the step of performing the photometric calibration further includes the steps of:
    creating a segmented silhouette from the shadow image;
    calculating a score indicative of the differences between coordinates in the line-up silhouette and coordinates in the segmented silhouette;
    optimizing setup parameters that result in a minimization of the calculated score; and indicating the interactive imaging system as being calibrated when the calculated score reaches a minimum score representing a substantial match.

13. A method of calibrating an interactive imaging system, the method comprising the steps of:
performing a geometric calibration process to create warp parameters to compensate for a parallax effect by mapping a sensed infrared view to a projection image; and
performing a photometric calibration process by matching a shadow image with the projection image,
wherein mapping the sensed infrared view to the projection image includes:
mapping, according to a first mapping process, the sensed infrared view to a sensed visible-light view;
mapping, according to a second mapping process, the sensed visible-light view to the projection image; and
performing a homography process by combining the first and second mapping processes.

14. The method of claim 13, wherein the homography process is a two-dimensional perspective transformation that maps pixels on a first plane defined by the sensed infrared view to pixels on a second plane defined by the projection image, the transformation made through an intermediate plane defined by the sensed visible-light view.

15. The method of claim 14, further comprising the steps of:
obtaining the sensed infrared view by detecting at least three non-linear reference points lying in a plane; and
obtaining the sensed visible-light view by detecting the at least three non-linear reference points and detecting corners of the projection image.

16. The method of claim 13, wherein the step of performing the photometric calibration includes the steps of:
allowing a user to stand between an image generator and a display medium, wherein the image generator is configured to project the projection image and the display medium configured to reflect the projection image; and
allowing the user to move into a position such that the shadow image cast by the user mimics a line-up silhouette of the projection image.

17. The method of claim 16, wherein the step of performing the photometric calibration further includes the steps of:
creating a segmented silhouette from the shadow image;
calculating a score indicative of the differences between coordinates in the line-up silhouette and coordinates in the segmented silhouette;
optimizing setup parameters that result in a minimization of the calculated score; and
indicating the interactive imaging system as being calibrated when the calculated score reaches a minimum score representing a substantial match.

18. A method of calibrating an interactive imaging system, the method comprising the steps of:
performing a geometric calibration process to create warp parameters to compensate for a parallax effect by mapping a sensed infrared view to a projection image; and
performing a photometric calibration process by matching a shadow image with the projection image, wherein the step of performing the photometric calibration includes the steps of:
allowing a user to stand between an image generator and a display medium, wherein the image generator is configured to project the projection image and the display medium configured to reflect the projection image; and
allowing the user to move into a position such that the shadow image cast by the user mimics a line-up silhouette of the projection image.

19. The method of claim 18, wherein the step of performing the photometric calibration further includes the steps of:
creating a segmented silhouette from the shadow image;
calculating a score indicative of the differences between coordinates in the line-up silhouette and coordinates in the segmented silhouette;
optimizing setup parameters that result in a minimization of the calculated score; and
indicating the interactive imaging system as being calibrated when the calculated score reaches a minimum score representing a substantial match.

\* \* \* \* \*